June 11, 1963     E. F. ELMS     3,092,884
SHEET METAL FASTENER

Filed April 23, 1959     2 Sheets-Sheet 1

INVENTOR.
EDWIN F. ELMS
BY
Barnes, Kisselle, Raisch & Choate
ATTORNEYS

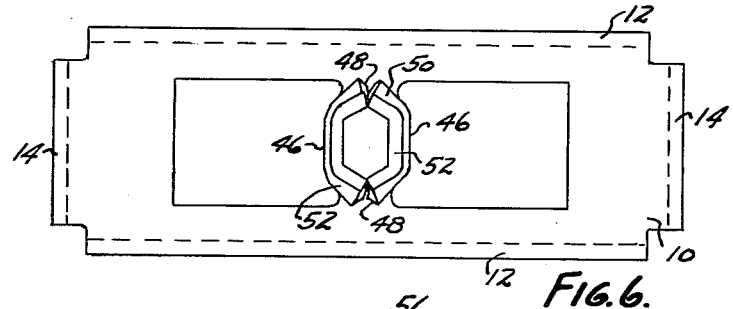
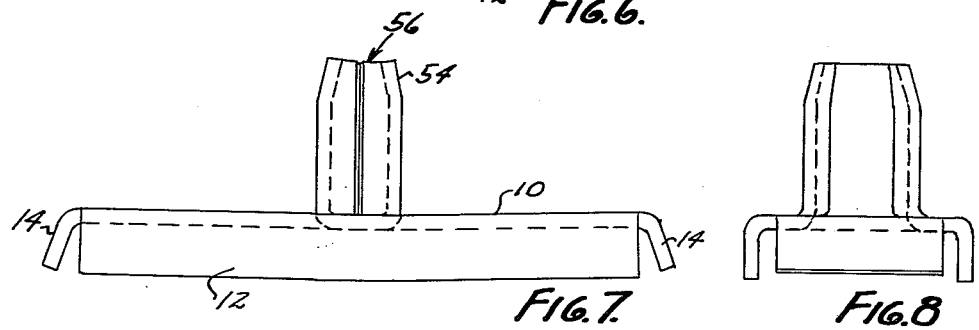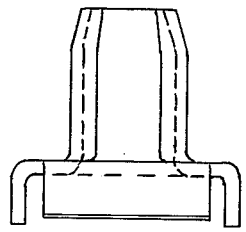
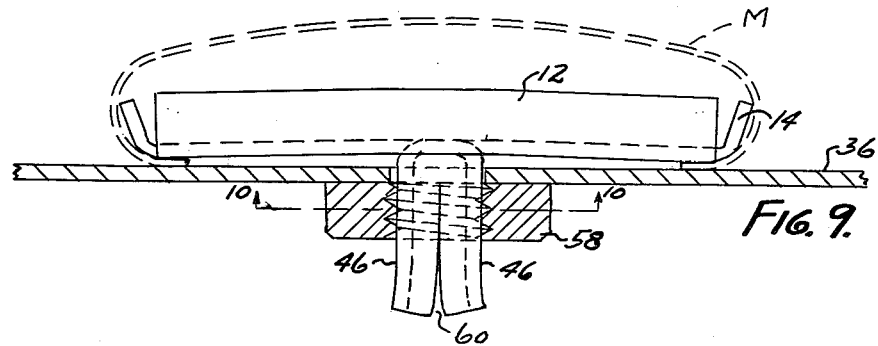
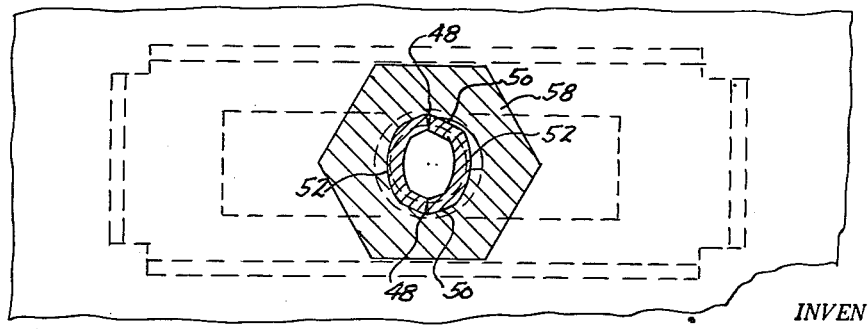

United States Patent Office 3,092,884
Patented June 11, 1963

3,092,884
SHEET METAL FASTENER
Edwin F. Elms, Roseville, Mich., assignor to
Robert L. Brown, Ferndale, Mich.
Filed Apr. 23, 1959, Ser. No. 808,507
11 Claims. (Cl. 24—73)

This invention relates to a sheet metal fastener and more particularly to a fastener of the type adapted for securing trim moldings to sheet metal panels.

Sheet metal fasteners for securing trim moldings, brackets, etc., to panels such as automotive body panels are of numerous different forms. One type of such fastener comprises a base portion to which the molding may be attached and a stud on said base portion which is adapted to be projected through an aperture in the panel and secured on the panel by means of a nut threaded on the stud on the backside of the panel.

The present invention relates generally to a fastener of this general type and it is an object of this invention to provide such a fastener which is of economical construction and which, at the same time, provides a locking action with the threads of the nut when the nut is secured in place.

A further object of this invention is to provide a fastener of the above described type wherein the stud portion of the fastener is formed as an integral part of the sheet metal stamping which forms the fastener.

Other objects and advantages of the present invention will become apparent from a consideration of the following description taken in conjunction with the drawings in which:

FIG. 6 is a plan view of another form of fastener embodying the present invention.

FIG. 7 is a side elevational view of the fastener shown in FIG. 6.

FIG. 8 is an end view of the fastener shown in FIG. 6.

FIG. 9 is a generally sectional view illustrating the assembly of the fastener shown in FIGS. 6 through 8 on a sheet metal panel.

FIG. 10 is a sectional view taken along the line 10—10 in FIG. 9.

Figure 1:
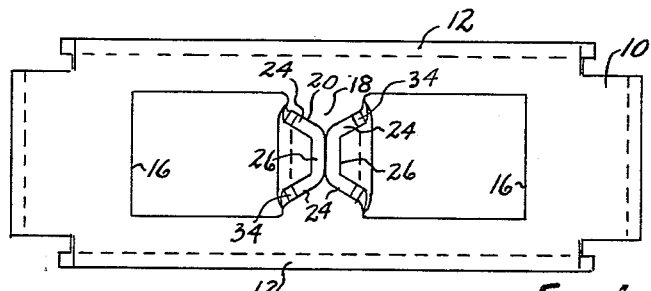
FIG. 1 is a plan view of one form of fastener according to the present invention.

While, as indicated above, the fastener of this invention may be used for securing moldings, brackets, etc. to support panels, for the purpose of illustration, the fastener will be described in relation to securing a trim molding to a body panel, the fastener illustrated in FIGS. 1 through 5 includes a generally rectangular base or head 10 having upright flanges 12 along opposite longitudinal edges thereof and outwardly inclined flanges 14 at opposite ends of base 10. Flanges 12 impart rigidity to base 10. The base 10 may be reinforced by other means such as ribs, etc. A pair of tabs are struck from base 10 leaving the notches 16 therein which are separated by a portion 18 by means of which the inner ends of the tabs are connected to the base 10 of the fastener. The tabs are generally referenced 20.

Each tab 20 includes a bend 22 by means of which the inner ends of the tabs are connected to the portion 18 of the base. Each tab is generally U-shaped trough shaped in horizontal section as illustrated and includes a pair of legs 24 which incline outwardly relative to one another and are connected by a flat bight portion 26. Adjacent the bends 22, the flattened bight portions 26 incline outwardly from one another in the direction towards base 10 as at 28 and interconnect the lower ends of the legs 24.

Figure 2:
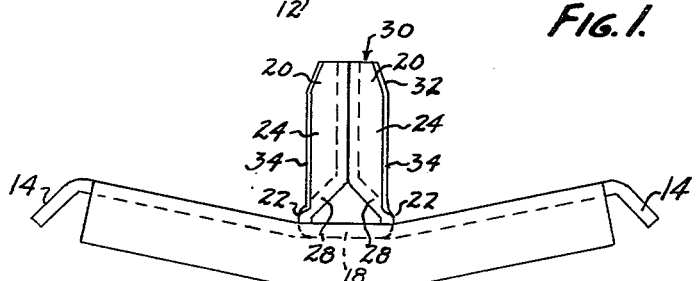
FIG. 2 is a side elevational view of the fastener shown in FIG. 1.

As is illustrated in FIG. 2, the two tabs 20 cooperate to form a stud 30 projecting from the base 10 of the fastener. The outer ends of legs 24 are chamfered or otherwise relieved slightly as illustrated to provide a tapered end 32 on the stud 30. As can be seen from FIGS. 1 and 2, the free longitudinal edges 34 of the legs 30 define a circle corresponding to the maximum diameter of the stud 30. If desired, base 10 may be arched slightly in a longitudinal direction as illustrated in FIG. 2.

Figure 3:
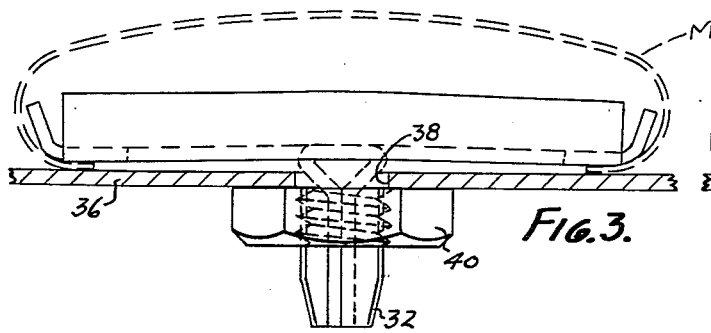
FIG. 3 is a side elevational view of the fastener illustrated in FIG. 1 showing the manner in which it is secured to a sheet metal panel for engaging a trim molding.
Figure 4:
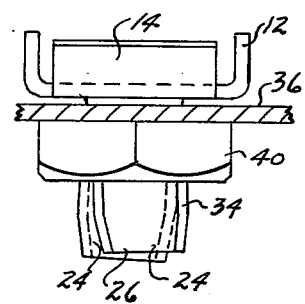
FIG. 4 is an end view of the assembly shown in FIG. 3.
Figure 5:
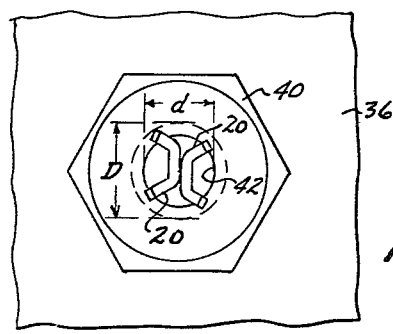
FIG. 5 is a fragmentary bottom plan view of the assembly shown in FIG. 3.

FIGS. 3, 4 and 5 illustrate the manner in which the fastener is secured to a sheet metal panel 36 provided with an aperture 38. To secure the fastener to panel 36, the stud 30 is inserted through the opening 38 in the panel. Thereafter, a nut 40 is threaded over stud 30. The size of the threaded opening 42 in nut 40 is selected such that the crest diameter of the threads, designated d, is less than and the root diameter of the threads, designated D, is greater than the diameter of the stud as determined by the distance between the diagonally opposite longitudinal edges 34 of tabs 20.

When a nut of this relative size is placed over the tapered end 32 of the stud and turned, the threads on the nut cut into the edges 34 of the stud and thereby cut a thread on the stud. However, since the stud is generally oversize as compared to the threaded opening in the nut, I have found that when the nut is tightened up against the back face of the panel 36 so as to draw the base 10 of the fastener up against the front face of the panel, the two tabs 20 distort in scissors fashion so that when the nut is secured tightly against the panel 36, the two tabs 20 are offset from one another as is clearly illustrated in FIGS. 4 and 5. This scissoring action of the two tabs results from the turning action of the nut as it is threaded over the stud. This scissoring action is, however, very beneficial since the stud becomes distorted, so to speak, and produces a locking action on the threads of the nut.

The fastener illustrated in FIGS. 6 through 10 differs from that illustrated in FIGS. 1 through 5 from the standpoint of construction primarily in that the two tabs designated 46 are shaped such that the longitudinal free edges 48 of the legs 50 that are connected by the bight portion 52 are contiguous and the flattened bight portions 52 are spaced apart. In other words, the legs 48 are reversely positioned with respect to the legs 20. At their outer ends, the two tabs 46 are nosed inwardly as at 54 to provide the stud generally designated 56 formed by the two tabs 46 with a tapered free end portion. The legs 50 which incline outwardly relative to each other and the flattened bight portions 52 of the two tabs provide the stud 56 with a cross section that is generally elliptical shape. The major diameter of the stud is defined by the free edges 48 of the tabs. The minor axis of the stud is defined by the outer faces of the flattened bight portions 52 of the tabs.

The nut employed for mounting the fastener illustrated in this form of the invention to the apertured panel 36 is preferably selected such that the root diameter of the thread is slightly larger than the major diameter of the stud and the crest diameter of the thread is slightly less than the diameter of the stud at the flattened bight portions 52. When the nut, designated 58, is threaded over the tapered end 54 of stud 56, the threads thereof bite into the free edge portions 48 of the two tabs 46 and cut their own thread therein. However, since the root diameter of the thread is slightly less than the major diameter of the stud, this threading action of the nut as it advances along the stud causes the legs 50 of the two tabs to be distorted radially inwardly and causes the bight portions 52 to bulge slightly in a radially outward direction. This distorting action causes the two tabs to spread apart slightly a progressively increasing amount in the direction of their free ends. Thus, when the nut 58 is securely tightened against the base face of panel 36, the free ends of the two tabs are spaced apart slightly. The clearance between the adjacent edges of the two legs is designated 60 in FIG. 9. This imposes a load on the threads of the nut which locks the nut on the stud.

Thus, it will be seen that the fasteners disclosed herein incorporate at least two very important features. In each instance, the stud is formed integrally with the stamping that provides the fastener. In addition, the stud is formed by two tabs which are so shaped and positioned relative to one another that when a nut is tightened thereon, the tabs forming the stud are distorted to lock the nut securely in place.

In each of the fasteners shown, the trim molding M is mounted on the panel 36 by interengagement with the outwardly inclined flanges 14 on the base 10 of the fastener. In the case of a sheet metal bracket as destinguished from a molding such as illustrated at M, the two tabs forming the stud could be formed as an integral part of the sheet metal bracket.

I claim:

1. A sheet metal fastener comprising a base having a pair of tabs struck out therefrom and projecting generally perpendicular from one face of the base, said tabs being generally trough shaped comprising a back portion with a pair of legs diverging therefrom said tabs being disposed adjacent one another in opposed contacting relation to form a stud projecting from said base, said tabs contacting one another throughout a substantial portion of their length to resist radial inward collapse of the stud, the opposed longitudinal free edges of said trough shaped tabs projecting outwardly from the back portion of each tab substantially uniformly to define the maximum diameter of the stud, said tabs having a generally smooth surface and the stud being slightly tapered at its free end.

2. A sheet metal fastener as called for in claim 1 wherein the tabs are disposed with their dished portions facing one another and with their longitudinal free edge portions contacting in inclined relation to define a pair of axially extending apexes on diametrically opposite sides of the stud.

3. A sheet metal fastener as called for in claim 1 wherein the tabs are disposed with their dished portions facing one another and the free longitudinal edges of the two tabs being contiguous.

4. A sheet metal fastener as called for in claim 1 wherein the tabs are disposed with their dished portions facing outwardly away from one another.

5. A sheet metal fastener as called for in claim 1 wherein said base is provided with flanges projecting from the side thereof opposite said stud and adapted for engagement with a trim molding.

6. A sheet metal fastener comprising a base having a pair of tabs struck out therefrom and projecting generally perpendicularly from one face of the base, said tabs being generally trough shaped in cross section with the dished portions thereof facing outwardly away from one another, said tabs being adjacently disposed to form a stud projecting from one face of said base, the free longitudinal edges of said tabs extending outwardly substantially uniformly from the body portions of the tabs and defining a circle corresponding to the greatest diameter of the stud, the back sides of the trough shaped tabs being in contacting relation throughout a substantial portion of their length to resist radial inward collapse and the free end of the stud being tapered.

7. A sheet metal fastener as called for in claim 6 wherein each trough shaped tab comprises in cross section a pair of legs which are outwardly inclined relative to each other and connected by a bight portion.

8. A sheet metal fastener as called for in claim 7 wherein the bight portions are substantially flat in a direction transversely of the axis of the stud, said substantially flat bight portions being in generally co-planar engagement.

9. A sheet metal fastener as called for in claim 8 wherein said substantially flat bight portions adjacent the connection between the tabs and the base incline outwardly from one another in the direction towards said base and provide a reinforcement connecting the free edges of the diverging legs.

10. A sheet metal fastener as called for in claim 9 wherein said base is provided with flanges projecting from the side thereof opposite said stud and adapted for engagement with a trim molding.

11. A sheet metal fastener comprising a head having a pair of integral tabs projecting therefrom, said tabs being generally trough-shaped comprising a generally flat back portion with a pair of generally flat legs diverging therefrom, said tabs being disposed adjacent one another in opposed relation to form a stud projecting from said head, said tabs contacting one another throughout a substantial portion of their length to resist radial inward collapse of the stud, the opposed longitudinal free edges of the trough-shaped tabs projecting substantially uniformly outwardly from the back portion of each tab so as to define the maximum diameter of the stud, said tabs having a generally smooth surface and the stud being slightly tapered at its free end.

References Cited in the file of this patent

UNITED STATES PATENTS

| | | |
|---|---|---|
| 561,913 | Paquette | June 9, 1896 |
| 2,075,024 | Delano | Mar. 30, 1937 |
| 2,201,335 | Cotter | May 21, 1940 |
| 2,618,824 | Poupitch | Nov. 25, 1952 |